US007564430B2

(12) United States Patent
Choi et al.

(10) Patent No.: US 7,564,430 B2
(45) Date of Patent: Jul. 21, 2009

(54) PLASMA DISPLAY APPARATUS AND DRIVING METHOD THEREOF

(75) Inventors: Jeong Pil Choi, Suwon-si (KR); Beong Ha Lim, Gumi-si (KR)

(73) Assignee: LG Electronics Inc., Seoul (KR)

( * ) Notice: Subject to any disclaimer, the term of this patent is extended or adjusted under 35 U.S.C. 154(b) by 593 days.

(21) Appl. No.: 11/121,918

(22) Filed: May 5, 2005

(65) Prior Publication Data

US 2005/0259044 A1 Nov. 24, 2005

(30) Foreign Application Priority Data

May 6, 2004 (KR) ...................... 10-2004-0031702

(51) Int. Cl.
*G09G 3/28* (2006.01)
*G06F 3/038* (2006.01)

(52) U.S. Cl. ............................ 345/68; 345/60; 345/63; 345/211; 345/690

(58) Field of Classification Search .................. 345/55, 345/58, 60, 61, 62, 63, 68, 204, 205, 206, 345/211, 212, 213; 315/111.01, 111.21, 315/160, 167, 169.1, 169.4; 313/483, 484, 313/567, 581, 582, 584, 585, 604, 622
See application file for complete search history.

(56) References Cited

U.S. PATENT DOCUMENTS 5,828,353 A * 10/1998 Kishi et al. .................. 345/55
6,111,556 A * 8/2000 Moon .......................... 345/60
6,476,561 B2 * 11/2002 Okada ...................... 315/169.1
6,781,322 B2 * 8/2004 Onozawa et al. ......... 315/169.3
2003/0122740 A1 * 7/2003 Lee et al. ...................... 345/60

FOREIGN PATENT DOCUMENTS

EP 1528531 A2 * 5/2005
JP 2000-172223 A 6/2000
JP 2000-206927 7/2000

* cited by examiner

*Primary Examiner*—My-Chau T Tran
(74) *Attorney, Agent, or Firm*—Birch, Stewart, Kolasch & Birch, LLP

(57) ABSTRACT

A plasma display apparatus and a driving method thereof are provided. In the inventive plasma display apparatus and the driving method, when an image is displayed by dividing one subfield into a reset period, an address period, and a sustain period, a second sustain pulse applied in the sustain period of the one subfield has a sustain voltage applying time point different from that of a first sustain pulse.

7 Claims, 14 Drawing Sheets

PLASMA DISPLAY APPARATUS AND DRIVING METHOD THEREOF

This Nonprovisional application claims priority under 35 U.S.C. § 119(a) on Patent Application No. 2004-0031702 filed in Korea on May 6, 2004, the entire contents of which are hereby incorporated by reference.

BACKGROUND OF THE INVENTION

1. Field of the Invention

The present invention relates to a plasma display apparatus and a driving method thereof, and more particularly, to a plasma display apparatus for preventing erroneous discharge, and a driving method thereof.

2. Description of the Background Art

In general, a plasma display panel (Hereinafter, referred to as "PDP") displays an image including a character or a graphic by exciting a phosphor using ultraviolet ray of 147 nm, which is generated when an inert mixture gas such as He+Xe, Ne+Xe, or He+Ne+Xe is discharged. The PDP not only facilitates its thinning and large sizing, but also provides a picture quality greatly improved due to recent technology development. Particularly, a three-electrode alternating current surface discharge type PDP has an advantage of a low voltage driving and a long lifetime because it stores wall charges on a surface in discharge and protects electrodes from sputtering caused by the discharge.

FIG. 1 is a perspective view illustrating a structure of a discharge cell of the conventional three-electrode alternating current surface discharge type plasma display panel.

Referring to FIG. 1, in the conventional three-electrode alternating current surface discharge type PDP, the discharge cell includes a scan electrode (Y) and a sustain electrode (Z) formed on an upper substrate 10, and an address electrode (X) formed on a lower substrate 18. The scan electrode (Y) and the sustain electrode (Z) respectively include transparent electrodes (12Y, 12Z), and metal bus electrodes (13Y and 13Z). The metal bus electrodes (13Y, 13Z) have smaller line widths than the transparent electrodes (12Y, 12Z), and are formed at one-side edges of the transparent electrodes (12Y, 12Z).

The transparent electrodes (12Y and 12Z) are generally formed of indium-tin-oxide (ITO) on the upper substrate 10. The metal bus electrodes (13Y, 13Z) are generally formed of metal such as chrome (Cr) on the transparent electrodes (12Y, 12Z) to reduce a voltage drop caused by the transparent electrodes (12Y, 12Z) having a high resistance. An upper dielectric layer 14 and a protective film 16 are layered on the upper substrate 10 on which the scan electrode (Y) and the sustain electrode (Z) are formed to be in parallel with each other. The wall charges generated in plasma discharge are stored in the upper dielectric layer 14. The protective film 16 prevents the upper dielectric layer 14 from being damaged due to sputtering caused by the plasma discharge, and increases an emission efficiency of secondary electrons. The protective film 16 is generally formed of magnesium oxide (MgO).

A lower dielectric layer 22 and a barrier rib 24 are formed on the lower substrate 18 on which the address electrode (X) is formed. A phosphor layer 26 is coated on the lower dielectric layer 22 and the barrier rib 24. The address electrode (X) is formed to intersect with the scan electrode (Y) and the sustain electrode (Z). The barrier rib 24 is formed to be in parallel with the address electrode (X). The barrier rib 24 prevents ultraviolet ray and visible ray generated due to the plasma discharge, from leaking to an adjacent discharge cell. The phosphor layer 26 is excited using the ultraviolet ray generated in the plasma discharge, thereby generating red, green or blue visible ray. A mixture of inert gases is injected into a discharge space provided between the upper/lower substrates 10 and 18 and the barrier rib 24.

In order to display a grayscale image, the PDP is time-division driven by dividing one frame into several subfields having a different number of emission times. Each subfield is divided into a reset period for initializing a whole screen, an address period for selecting a scan line and selecting a cell in the selected scan line, and a sustain period for embodying grayscale according to the number of discharge times.

The reset period is divided into a setup period for supplying a ramp-up waveform, and a setdown period for supplying a ramp-down waveform. In case where the image is displayed in 256 grayscales, a frame period (16.67 ms) corresponding to a 1/60 second is divided into eight sub-fields as shown in FIG. 2. As described above, each of the eight sub-fields is divided into the reset period, the address period, and the sustain period. The reset period and the address period are the same at each sub-field, whereas the sustain period is increased in a ratio of $2^n$(n=0, 1, 2, 3, 4, 5, 6, 7) at each sub-field.

FIG. 3 illustrates driving waveforms supplied to two subfields in the PDP.

Referring to FIG. 3, the PDP is driven by dividing each subfield into the reset period, the address period for selecting the cell, and the sustain period for sustaining a discharge of the selected cell.

In a setup period of the reset period, the ramp-up waveform (Ramp-up) is concurrently applied to all scan electrodes CY). The ramp-up waveform (Ramp-up) generates a weak discharge (setup discharge) within the cells of the whole screen, thereby generating the wall charge within the cells. In a setdown period, after the ramp-up waveform is supplied, the ramp-down waveform (Ramp-down) falling from a lower positive voltage than a peak voltage of the ramp-up waveform (Ramp-up) is concurrently applied to the scan electrodes (Y). The ramp-down waveform (Ramp-down) generates a weak erasure discharge within the cells, thereby erasing an unnecessary one of a space charge and the wall charge generated due to the setup discharge, and allowing the wall charge necessary for an address discharge to uniformly remain within the cells of the whole screen.

In the address period, a negative scan pulse (scan) is sequentially applied to the scan electrodes (Y) and at the same time, a positive data pulse (data) is applied to the address electrodes (X). A voltage difference between the scan pulse (scan) and the data pulse (data) is added to the wall charge generated in the reset period, while the address discharge is generated within the cell to which the data pulse (data) is applied. The wall charge is generated within the cells selected by the address discharge.

During the setdown period and the address period, a positive direct current voltage of the sustain voltage (Vs) is supplied to the sustain electrode (Z).

In the sustain period, the sustain pulse (Sus) is alternately supplied to the scan electrodes (Y) and the sustain electrode (Z). If so, in the cell selected by the address discharge, the wall voltage and the sustain pulse (Sus) are added, while the sustain discharge is generated in a surface discharge type between the scan electrode CY) and the sustain electrode (Z) whenever the sustain pulse (Sus) is applied. Upon completion of the sustain discharge, an erasure ramp waveform (erase) having a smaller pulse width is supplied to the sustain electrode (Z), thereby erasing the wall charge from the cell.

In the PDP, the sustain discharge requires a high voltage of hundreds of volts. Accordingly, in order to minimize a driving power necessary for the sustain discharge, an energy recovery device is being used. The energy recovery device recovers a voltage between the scan electrode (Y) and the sustain electrode (Z), and reuses the recovered voltage as a driving voltage in a next discharge.

FIG. 4 illustrates the energy recovery device installed at the scan electrode (Y) to recover a sustain discharge voltage. Actually, the energy recovery device is symmetrically installed even at the sustain electrode (Z) centering on a panel capacitor (Cp).

Referring to FIG. 4, the inventive energy recovery device includes an inductor (L) connected between the panel capacitor (Cp) and a source capacitor (Cs); first and third switches (S1, S3) connected to be in parallel with each other between the source capacitor (Cs) and the inductor (L); second and fourth switches (S2, S4) connected to be in parallel with each other between the panel capacitor (Cp) and the inductor (L); and diodes (D5, D6) each installed between the first and third switches (S1, S3) and the inductor (L).

The panel capacitor (Cp) equivalently represents an electrostatic capacitance formed between the scan electrode (Y) and the sustain electrode (Z). The second switch (S2) is connected to the sustain voltage source (Vs), and the fourth switch (S4) is connected to a ground voltage source (GND). The source capacitor (Cs) recovers the voltage charged to the panel capacitor (Cp) in the sustain discharge, and is charged with the recovered voltage, and again supplies the charged voltage to the panel capacitor (Cp).

For this, the source capacitor (Cs) has a capacitance for charging with a voltage of Vs/2 corresponding to a half of the sustain voltage source (Vs). The inductor (L) forms a resonance circuit together with the panel capacitor (Cp). The first to fourth switches (S1 to S4) control a current flow. Fifth and sixth diodes (D5, D6) prevent a reverse flow of current. Internal diodes (D1 to D4) are respectively installed even at the first to fourth switches (S1 to S4) to prevent the reverse flow of current.

FIG. 5 shows a timing diagram illustrating on/off timings of the switches, and a waveform diagram illustrating a waveform of the panel capacitor shown in FIG. 4.

An operation process will be in detail described on the basis of the assumption that before a period of T1, a voltage of 0[V] is charged to the panel capacitor (Cp) and the voltage of Vs/2 is charged to the source capacitor (Cs).

In the period of T1, the first switch (S1) is turned on, thereby forming a current path from the source capacitor (Cs) to the first switch (S1), the inductor (L), and the panel capacitor (Cp). If the current path is formed, the voltage of Vs/2 charged to the source capacitor (Cs) is supplied to the panel capacitor (Cp). At this time, the sustain voltage (Vs), which is two times as much as a voltage of the source capacitor (Cs), is charged to the panel capacitor (Cp) owing to a series resonance circuit constituted of the inductor (L) and the panel capacitor (Cp). Actually, a little lower voltage than the sustain voltage (Vs) is charged to the panel capacitor (Cp).

In a period of T2, the second switch (S2) is turned on. If so, a voltage of the sustain voltage source (Vs) is supplied to the panel capacitor (Cp). If so, the voltage of the panel capacitor (Cp) is prevented from falling below a reference voltage (Vs). Accordingly, the sustain discharge is stably generated. The voltage of the panel capacitor (Cp) rises approximately up to the sustain voltage (Vs) during the period of T1. Therefore, an external supply voltage can be minimized during the period of T2. That is, power consumption can be reduced.

In a period of T3, the first switch (S1) is turned off. At this time, the panel capacitor (Cp) sustains the sustain voltage (Vs).

In a period of T4, a second switch (S2) is turned off and a third switch (S3) is turned on. If the third switch (S3) is turned on, a current path from the panel capacitor (Cp) to the inductor (L), the third switch (S3), and the source capacitor (Cs) is formed, thereby recovering the charged voltage of the panel capacitor (Cp) to the source capacitor (Cs). At this time, the voltage of Vs/2 is charged to the source capacitor (Cs).

In a period of T5, a third switch (S3) is turned off and a fourth switch (S4) is turned on. If the fourth switch (S4) is turned on, a current path between the panel capacitor (Cp) and the ground voltage source (GND) is formed, thereby allowing the voltage of the panel capacitor (Cp) to fall down to 0[V]. In a period of T6, a state of the period of T5 is sustained for a predetermined time. Actually, an alternating current driving pulse supplied to the scan electrode (Y) and the sustain electrode (Z) is obtained by periodically repeating the periods of T1 to T6.

However, if the PDP is driven at a high temperature (above 40° C.) or a low temperature (below 0° C.) or has a high resolution, erroneous discharge is generated. In a detailed description, as shown in FIGS. 6A and 6B, the PDP generally supplies a scan pulse in a sequence, to select the discharge cell to be turned on. Accordingly, even in the discharge cells respectively formed along the scan electrodes (Y), the address discharge is sequentially generated corresponding to a supply sequence of the scan pulse.

If the address discharge is sequentially generated, an unstable address discharge is generated in the discharge cells having a later scan sequence, that is, in the discharge cells for supplying the scan pulse in a latter half of the address period. In other words, in the discharge cells where the wall charges formed in the reset period are recombined and the scan pulse is supplied in the latter half of the address period, the unstable address discharge (sufficient wall charge is not formed) is generated. Due to the unstable address discharge, the wall charge is not sufficiently formed and the sustain discharge is not generated in the sustain period. This phenomenon is much caused when the PDP is driven at the high temperature or at the low temperature or the panel has a larger resolution.

In the experiment of a specific PDP, the unstable sustain discharge is generated in the discharge cells having an earlier scan sequence. This phenomenon is expected to be caused due to the recombination of the wall charges, which are formed by the address discharge in the discharge cells having the earlier scan sequence. This phenomenon is much caused when the PDP is driven at the high temperature or at the low temperature or the panel has the larger resolution.

SUMMARY OF THE INVENTION

Accordingly, an object of the present invention is to solve at least the problems and disadvantages of the background art.

An object of the present invention is to provide a plasma display apparatus and a driving method thereof for preventing erroneous discharge when a plasma display panel is driven.

To achieve these and other advantages and in accordance with the purpose of the present invention, as embodied and broadly described, there are provided a plasma display apparatus and its driving method for displaying an image by dividing one subfield into a reset period, an address period, and a sustain period, wherein a second sustain pulse applied in the sustain period of the one subfield has a sustain voltage applying time point different from that of a first sustain pulse.

The second sustain pulse has the sustain voltage applying time point earlier than that of the first sustain pulse.

The second sustain pulse is applied to any one of a scan electrode and a sustain electrode, earlier than the first sustain pulse during the sustain period.

The second sustain pulse and the first sustain pulse have an applying period of 300 ns to 400 ns.

According to another aspect of the present invention, there are provided a plasma display apparatus and its driving method for displaying an image by dividing one subfield into a reset period, an address period, and a sustain period, wherein a sustain pulse applied in the sustain period of the one subfield is controlled, in sustain voltage applying time point, according to a scan sequence.

As the address period has an earlier scan sequence, the sustain pulse has an earlier sustain voltage applying time point.

According to a further aspect of the present invention, there are provided a plasma display apparatus and its driving method for displaying an image by dividing one subfield into a reset period, an address period, and a sustain period, wherein a sustain pulse applied in the sustain period of the one subfield is controlled, in sustain voltage applying time point, according to a temperature.

As the temperature increases, the sustain pulse has an earlier sustain voltage applying time.

The sustain pulse has an applying period of 300 ns to 400 ns.

The above present invention stably forms the wall charges within the cell in the sustain period, thereby generating the stable discharge.

BRIEF DESCRIPTION OF THE DRAWINGS

The invention will be described in detail with reference to the following drawings in which like numerals refer to like elements.

DETAILED DESCRIPTION OF PREFERRED EMBODIMENTS

Preferred embodiments of the present invention will be described in a more detailed manner with reference to the drawings.

Figure 7:
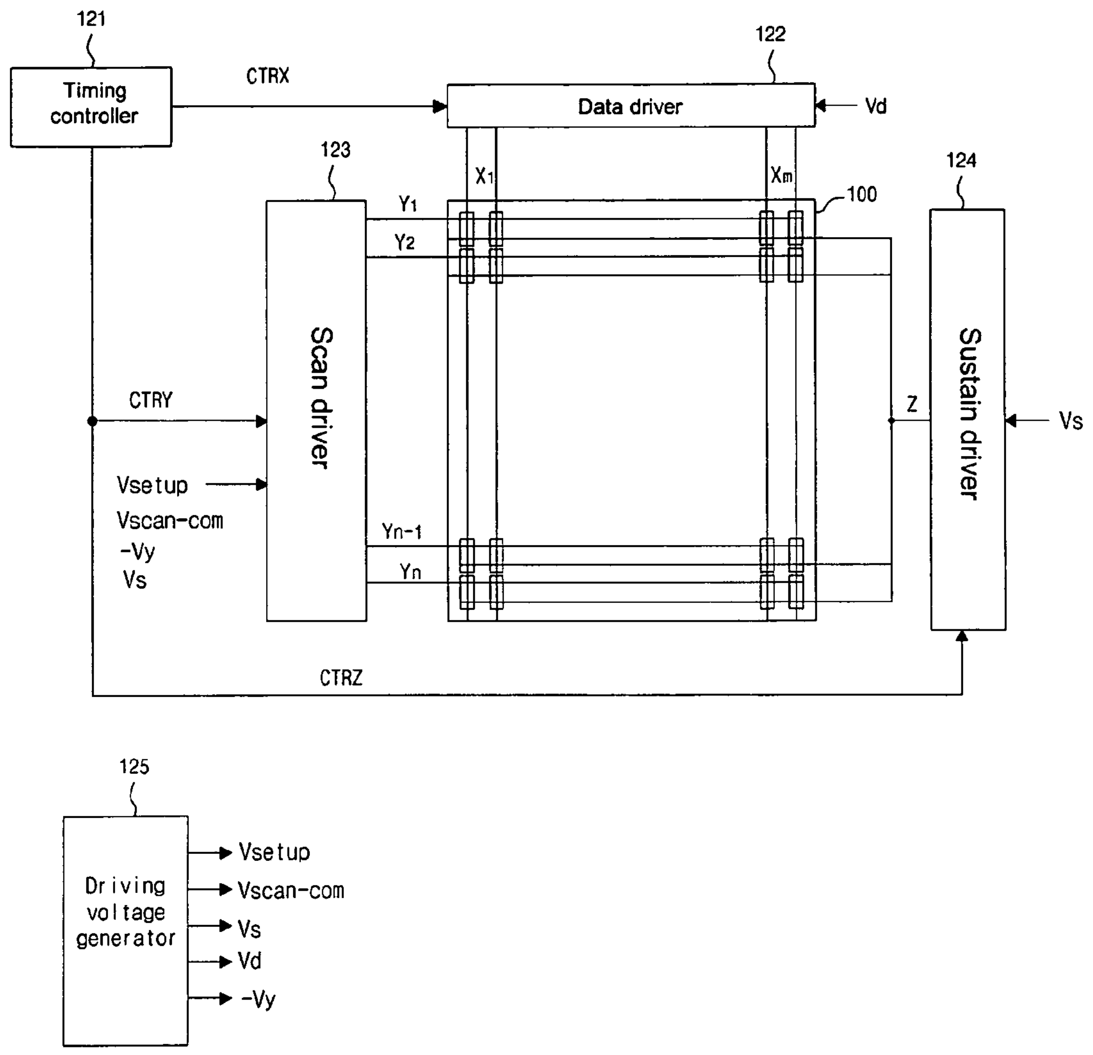
FIG. 7 is a schematic view illustrating a structure of a plasma display apparatus according to the present invention.

FIG. 7 is a schematic view illustrating a structure of a plasma display apparatus according to the present invention.

Referring to FIG. 7, the inventive plasma display apparatus includes a plasma display panel 100; a data driver 122 for supplying data to address electrodes (X1 to Xm), which are formed on a lower substrate (not shown) of the plasma display panel 100; a scan driver 123 for driving scan electrodes (Y1 to Yn); a sustain driver 124 for driving sustain electrodes (Z) being common electrodes; a timing controller 121 for controlling the data driver 122, the scan driver 123, the sustain driver 124 and a sustain pulse controller (not shown) when the plasma display panel is driven; and a driving voltage generator 125 for supplying a necessary driving voltage to each of the drivers 122, 123 and 124.

The inventive plasma display apparatus displays an image having a frame by combining at least two subfields where a driving pulse is applied to an address electrode, a scan electrode and a sustain electrode in a reset period, an address period, and a sustain period.

In the plasma display panel 100, an upper substrate (not shown) and the lower substrate (not shown) are attached with each other at a predetermined distance. In the upper substrate, a plurality of electrodes, for example, the scan electrodes (Y1 to Yn) and the sustain electrode (Z) are paired. In the lower substrate, the address electrodes (X1 to Xm) are formed to intersect with the scan electrodes (Y1 to Yn) and the sustain electrode (Z).

The data driver 122 receives data, which is inverse gamma corrected and error diffused in an inverse gamma correction circuit and error diffusion circuit (not shown), and then mapped to each subfield in a subfield mapping circuit. In the data driver 122, data is sampled and latched in response to a timing control signal (CTRX) from the timing controller 121 and then, is supplied to the address electrodes (X1 to Xm).

Under the control of the timing controller 121, the scan driver 123 supplies a ramp-up waveform (Ramp-up) and a ramp-down waveform (Ramp-down) to the scan electrodes (Y1 to Yn) during the reset period. Under the control of the timing controller 121, the scan driver 123 sequentially supplies a scan pulse (Sp) of a scan voltage (−Vy) to the scan electrodes (Y1 to Yn) during the address period, and supplies a sustain pulse (Sus) to the scan electrodes (Y1 to Yn) during the sustain period.

Under the control of the timing controller 121, the sustain driver 124 supplies a bias voltage of a sustain voltage (Vs) to the sustain electrode (Z) during a ramp-down waveform generation period and the address period, and operates alternately with the scan driver 123 during the sustain period to supply the sustain pulse (Sus) to the sustain electrode (Z).

In the sustain pulse (Sus) each supplied to the scan electrodes (Y1 to Yn) and the sustain electrode (Z) during the sustain period by the scan driver 123 and the sustain driver 124, an applying time point of the sustain voltage CVs) is different according to a sustain pulse supply sequence condition for supplying each electrode during the sustain period, a scan sequence condition for scanning the scan electrodes during the address period, and a temperature condition in driving the plasma display panel. This will be described in detail in a later description for a driving method of the plasma display apparatus according to the present invention.

However, it is desirable that, even though the sustain pulse has the different sustain voltage applying time point according to the above conditions, the sustain pulse applied to the scan electrode and the sustain electrode has a total applying period of 300 ns to 400 ns. This is to prevent an erroneous operation of a driving element according to the applying period of the sustain pulse, and an erroneous discharge in the driving of the inventive plasma display apparatus. That is because when the sustain pulse has a total applying period of less 300 ns, the sustain pulse has a great current picking component in a characteristic of the driving element for generating the sustain pulse, thereby causing the driving element to be in an erroneous operation state or in a disabling state, and when the sustain pulse has a total applying period of more 400 ns, an efficiency of preventing the erroneous discharge is degraded even though the sustain voltage is applied with its applying time point being different according to the condition to the scan electrode and the sustain electrode.

The timing controller 121 receives a vertical/horizontal synchronization signal and a clock signal, generates timing control signals (CTRX, CTRY and CTRZ) for controlling operation timing and synchronization of each of the drivers 122, 123 and 124 in the reset period, the address period and sustain period, and supplies the timing control signals (CTRX, CTRY and CTRZ) to the corresponding drivers 122, 123 and 124 to control each of the drivers 122, 123 and 124.

The data control signal (CTRX) includes a sampling clock for sampling data, a latch control signal, and a switch control signal for controlling an on/off time of an energy recovery circuit and a driving switch element. The scan control signal (CTRY) includes a switch control signal for controlling an on/off time of an energy recovery circuit and a driving switch element, which are installed in the scan driver 123. The sustain control signal (CTRZ) includes a switch control signal for controlling on/off time of an energy recovery circuit and a driving switch element, which are installed in the sustain driver 124.

The driving voltage generator 125 generates a setup voltage (Vsetup), a scan common voltage (Vscan−com), a scan voltage (−Vy), a sustain voltage (Vs), and a data voltage (Vd). The driving voltages can be varied according to a composition of a discharge gas or a structure of the discharge cell.

Figure 8A:
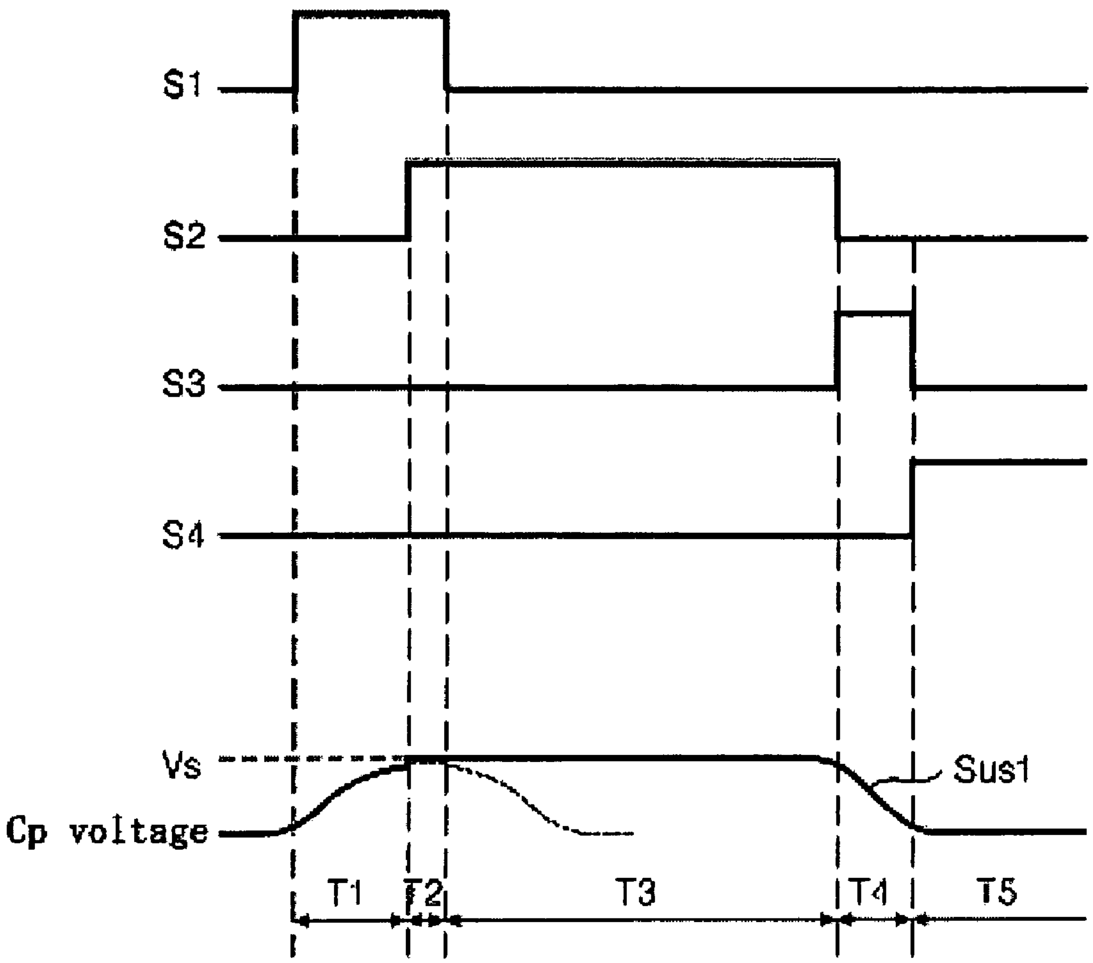
FIGS. 8A and 8B are waveform diagrams illustrating an operation timing of an energy recovery device, for describing a driving method of a plasma display apparatus according to the present invention.
Figure 8B:
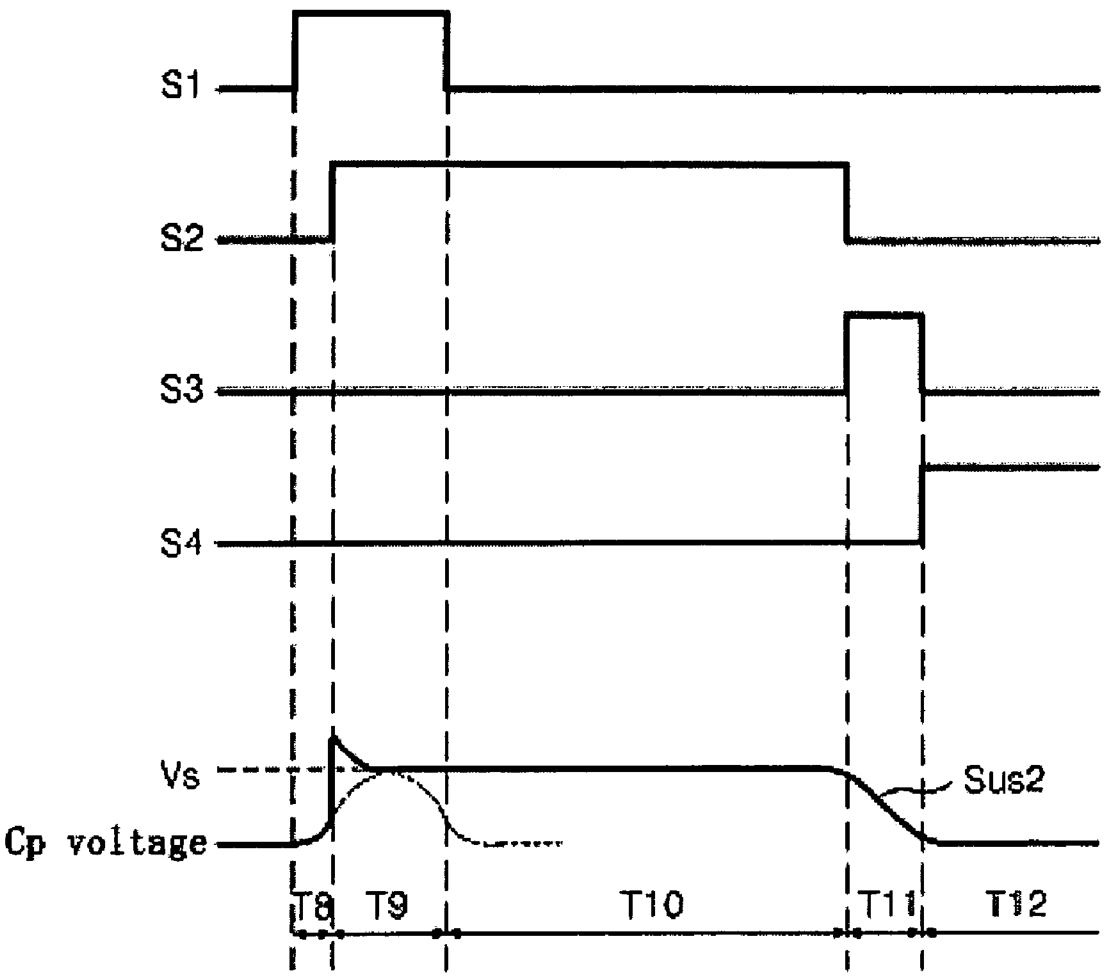

FIGS. 8A and 8B are waveform diagrams illustrating an operation timing of an energy recovery device, for describing the driving method of the plasma display apparatus according to the present invention. The inventive energy recovery device controls a turn-on timing of a second switch (S2) of FIG. 4 in response to a scan sequence.

In a plasma display panel (PDP) region where a sustain discharge is stably generated, an operation timing of the energy recovery device is controlled using the operation timing of FIG. 8A.

Figure 4:
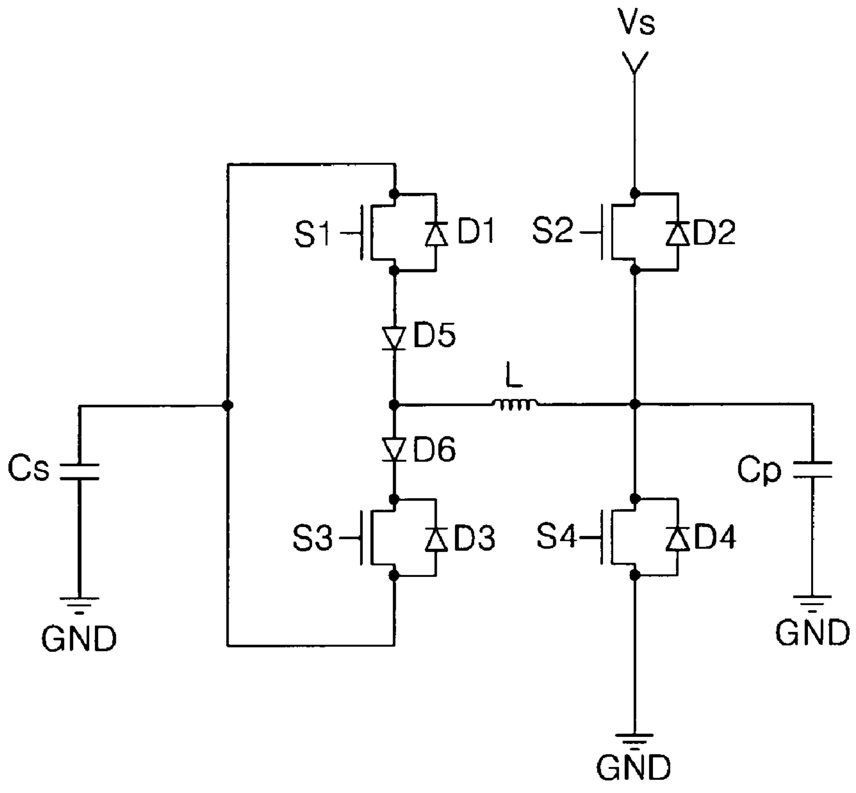
Fig. 4 Related Art
FIG. 4 is a circuit diagram illustrating a conventional energy recovery circuit for supplying a sustain pulse.
Figure 5:
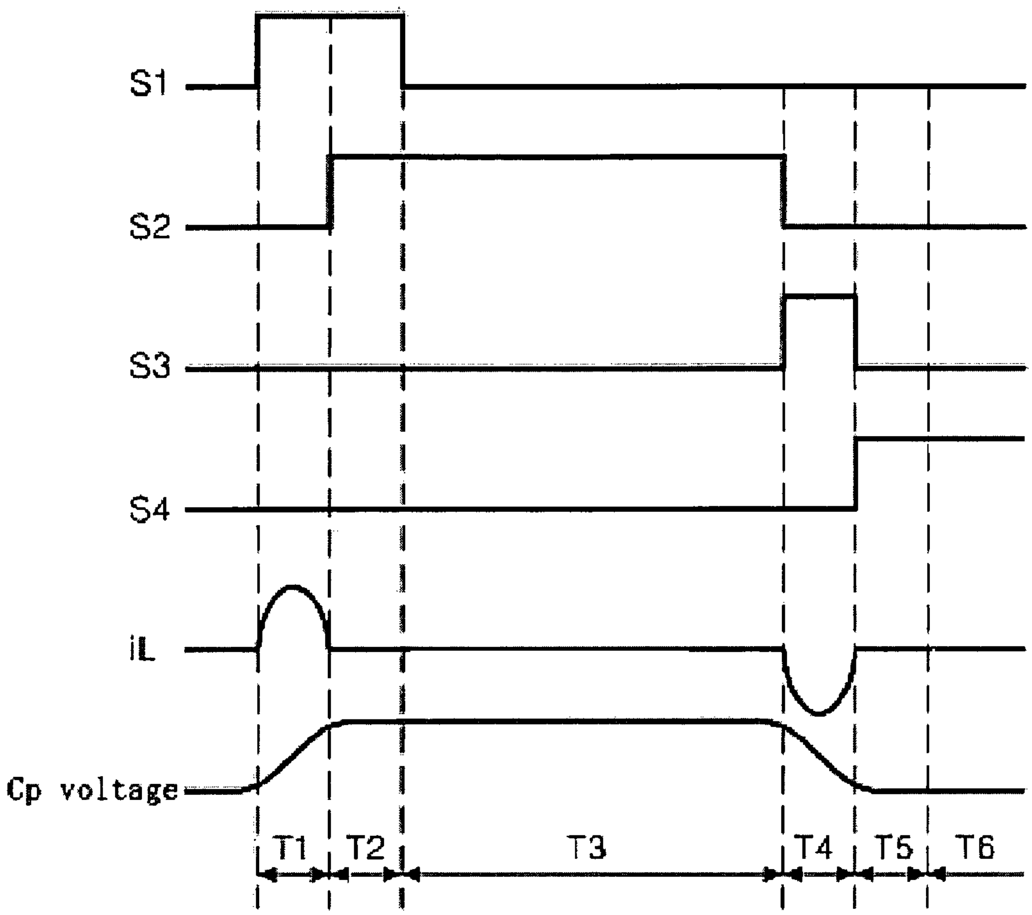
Fig. 5 Related Art
FIG. 5 is a waveform diagram illustrating an operation timing of the energy recovery circuit of FIG. 4.
Figure 6A:
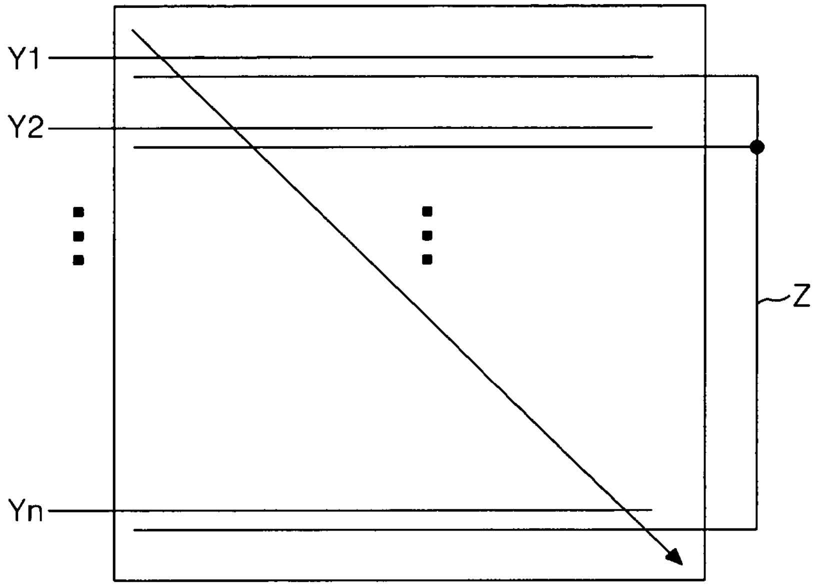
Fig. 6a Related Art
FIGS. 6A and 6B are views illustrating a scan sequence of a conventional plasma display panel.
Figure 6B:
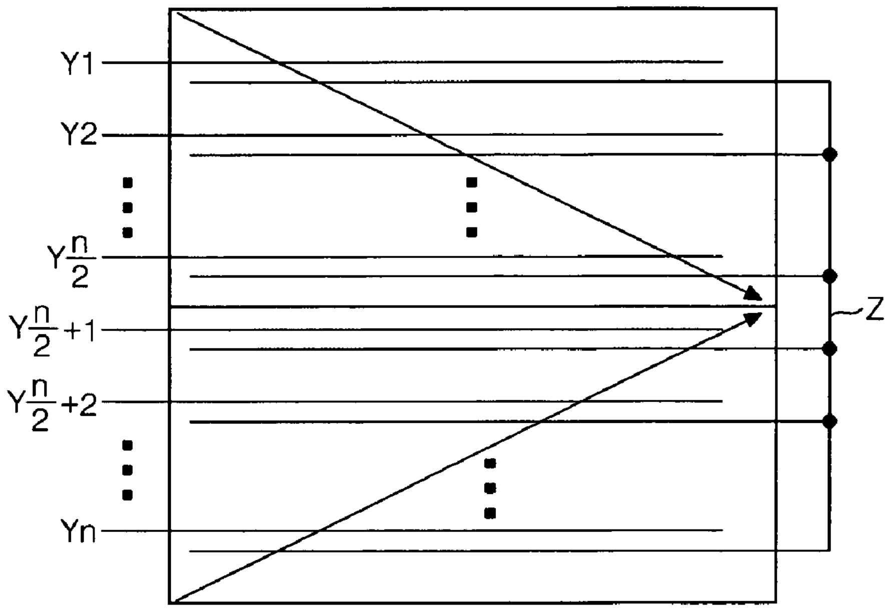
Fig. 6b Related Art

Referring to FIGS. 8A and 4, the sustain pulse (voltage supplied to a panel capacitor (Cp)) supplied to the scan electrodes (Y) positioned at the PDP region for stably generating the sustain discharge will be described in detail. First, an operation description will be in detail made on the assumption that before a period of T1, a voltage of 0 [V] is charged to the panel capacitor (Cp) and a voltage of Vs/2 is charged to a source capacitor (Cs).

In the period of T1, a first switch (S1) is turned on, thereby forming a current path from the source capacitor (Cs) to the first switch (S1), an inductor (L) and the panel capacitor (Cp). If the current path is formed, the voltage of Vs/2 charged to the source capacitor (Cs) is supplied to the panel capacitor (Cp). At this time, even the voltage charged to the panel capacitor (Cp) gradually rises in a resonance wave format due to a series resonance circuit constituted of the inductor (L) and the panel capacitor (Cp).

When the sustain voltage (Vs) is approximately charged to the panel capacitor (Cp), a second switch (S2) is turned on (T2 period). If the second switch (S2) is turned on, a voltage of the sustain voltage source (Vs) is supplied to the panel capacitor (Cp). If the voltage of the sustain voltage source (Vs) is supplied to the panel capacitor (Cp), the voltage of the panel capacitor (Cp) is prevented from falling below a reference voltage (Vs). Accordingly, the sustain discharge is stably generated. The voltage of the panel capacitor (Cp) rises approximately up to the sustain voltage (Vs) during the period of T1 and therefore, an external supply voltage can be minimized during the period of T2.

In a period of T3, the first switch (S1) is turned off. At this time, the panel capacitor (Cp) sustains the sustain voltage (Vs).

In a period of T4, the second switch (S2) is turned off and a third switch (S3) is turned on. If the third switch (S3) is turned on, a current path from the panel capacitor (Cp) to the inductor (L), the third switch (S3), and the source capacitor (Cs) is formed, thereby recovering the charged voltage of the panel capacitor (Cp) to the source capacitor (Cs). At this time, the voltage of Vs/2 is charged to the source capacitor (Cs).

In a period of T5, the third switch (S3) is turned off and a fourth switch (S4) is turned on. If the fourth switch (S4) is turned on, a current path between the panel capacitor (Cp) and a ground voltage source (GND) is formed, thereby allowing the voltage of the panel capacitor (Cp) to fall down to 0[V]. The period of T5 is set up to the time when the sustain pulse of the same format is supplied to the sustain electrode (Z). In the energy recovery device for supplying the sustain pulse to the scan electrodes (Y) and the sustain electrode (Z) that are positioned at the PDP region where the sustain discharge is stably generated, the turn-on timing of the second switch (S2) is actually set up to the time where the sustain voltage (Vs) is approximately charged to the panel capacitor (Cp), thereby minimizing power consumption.

In the PDP region where the sustain discharge is unstably generated, the operation timing of the energy recovery device is controlled according to the timing of the FIG. 7B.

Referring to FIGS. 8B and 4, the sustain pulse (voltage supplied to the panel capacitor (Cp)) supplied to the scan electrodes (Y) positioned at the PDP region for unstably generating the sustain discharge will be described in detail. First, an operation description will be in detail made on the assumption that before a period of T8, the voltage of 0[V] is charged to the panel capacitor (Cp) and the voltage of Vs/2 is charged to the source capacitor (Cs).

In the period of T8, the first switch (S1) is turned on, thereby forming the current path from the source capacitor (Cs) to the first switch (S1), the inductor (L) and the panel capacitor (Cp). If the current path is formed, the voltage of Vs/2 charged to the source capacitor (Cs) is supplied to the panel capacitor (Cp). At this time, even the voltage charged to the panel capacitor (Cp) gradually rises in the resonance wave format due to the series resonance circuit constituted of the inductor (L) and the panel capacitor (Cp).

When a predetermined voltage is approximately charged to the panel capacitor (Cp), a second switch (S2) is turned on (T9 period). If the second switch (S2) is turned on, a voltage of the sustain voltage source (Vs) is supplied to the panel capacitor (Cp). The sustain pulse is set to have more abrupt (large) rising slope than that of FIG. 8A. If the voltage of the sustain voltage source (Vs) is supplied to the panel capacitor (Cp), the voltage of the panel capacitor (Cp) is sustained to the sustain voltage CVs) and accordingly, the sustain discharge is stably generated. The second switch (S2) is turned on when a predetermined low voltage (for example, the voltage of less Vs/2) is supplied to the panel capacitor (Cp). If so, the voltage of the panel capacitor (Cp) abruptly rises. Therefore, a strong sustain discharge is generated within a cell.

In its detailed description, during the period of T8 for which the first switch (S1) is turned on, the panel capacitor (Cp) receives the voltage gradually rising in the resonance wave format. If the voltage of less Vs/2 is supplied to the panel capacitor (Cp) and the second switch (S2) is turned on, the voltage of the panel capacitor (Cp) abruptly rises. Actually, if the voltage of less Vs/2 is supplied to the panel capacitor (Cp) and the second switch (S2) is turned on, the voltage of the panel capacitor (Cp) rises (Vs+$\alpha$) above the sustain voltage (Vs) and falls to the sustain voltage (Vs). At this time, a strong sustain discharge is generated within the cell.

In other words, in order to generate the strong sustain discharge from the scan electrodes (Y) positioned at the PDP region where the unstable sustain discharge is generated, the present invention can set the second switch (S2) to have more quick turn-on timing (T8<T1) than that of other regions, thereby allowing the stable sustain discharge.

In a period of T10, the first switch (S1) is turned off. At this time, the panel capacitor (Cp) sustains the sustain voltage (Vs).

In a period of T11, the second switch (S2) is turned off and the third switch (S3) is turned on. If the third switch (S3) is turned on, the current path from the panel capacitor (Cp) to the inductor (L), the third switch (S3), and the source capacitor (Cs) is formed, thereby recovering the charged voltage of the panel capacitor (Cp) to the source capacitor (Cs). At this time, the voltage of Vs/2 is charged to the source capacitor (Cs).

In a period of T12, the third switch (S3) is turned off and the fourth switch (S4) is turned on. If the fourth switch (S4) is turned on, the current path between the panel capacitor (Cp) and the ground voltage source (GND) is formed, thereby allowing the voltage of the panel capacitor (Cp) to fall to 0[V]. The period of T12 is set up to the time when the sustain pulse of the same format is supplied to the sustain electrode (Z). Actually, in the energy recovery device for supplying the sustain pulse to the scan electrodes (Y) and the sustain electrode (Z), which are positioned at the PDP region where the unstable sustain discharge is generated, the turn-on timing of the second switch (S2) is set to the time when the voltage of less Vs/2 is charged to the panel capacitor (Cp). Accordingly, the sustain discharge can be stably generated.

Meantime, in the present invention, the turn-on timing of FIGS. 8A and 8B can be applied in various types. Hereinafter, for a description convenience, the sustain pulse supplied according to the timing of FIG. 8A is referred to as a second sustain pulse (Sus2).

Figure 9:
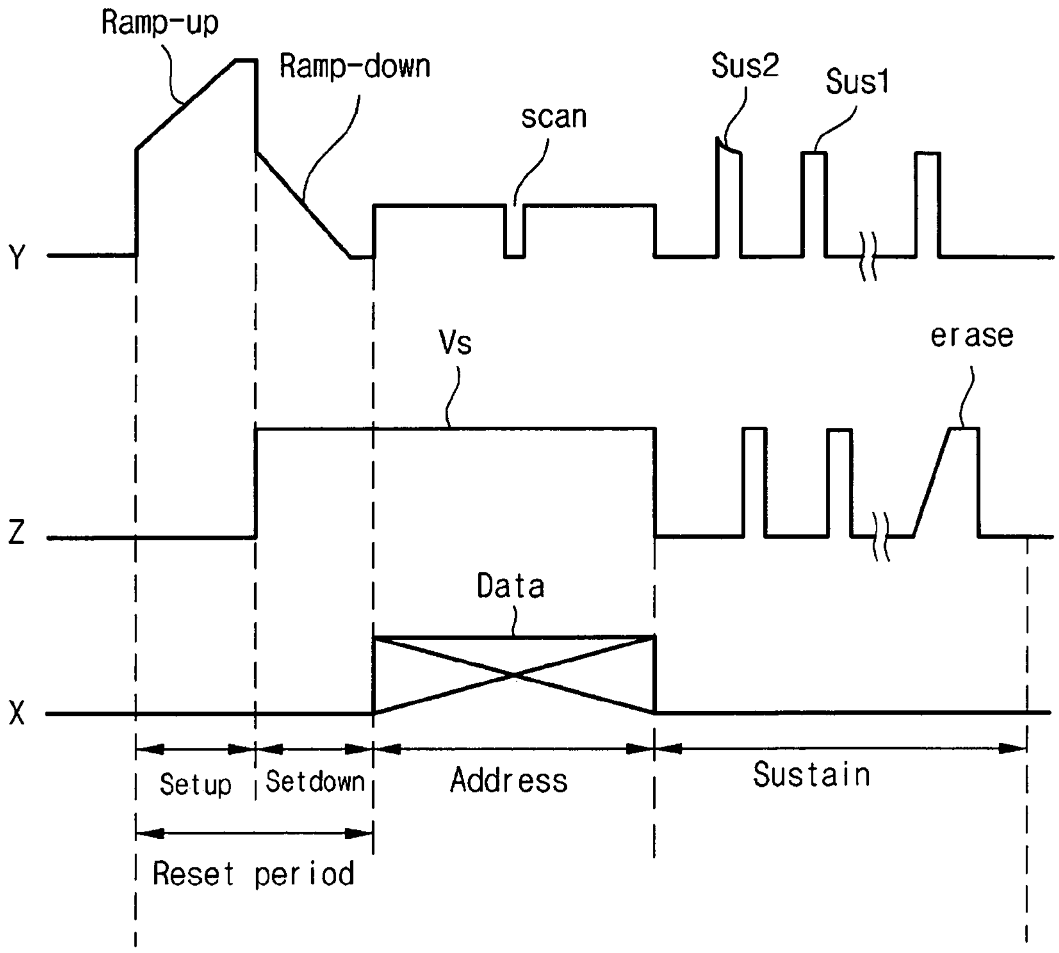
FIG. 9 is a view illustrating a driving method of a plasma display apparatus according to a first embodiment of the present invention.

FIG. 9 is a view illustrating a driving method of the plasma display apparatus according to a first embodiment of the present invention.

Referring to FIG. 9, the inventive PDP is driven by dividing each subfield into a reset period for initializing a whole screen, an address period for selecting a cell, and a sustain period for sustaining a discharge of the selected cell.

In a setup period of the reset period, the ramp-up waveform (Ramp-up) is concurrently applied to all scan electrodes (Y). The ramp-up waveform (Ramp-up) generates a weak discharge (setup discharge) within the cells of the whole screen, thereby generating the wall charge within the cells. In a set down period, after the ramp-up waveform is supplied, the ramp-down waveform (Ramp-down) falling from a positive voltage lower than a peak voltage of the ramp-up waveform (Ramp-up) is concurrently applied to the scan electrodes (Y). The ramp-down waveform (Ramp-down) generates a weak erasure discharge within the cells, thereby erasing an unnecessary one of a space charge and the wall charge generated in the setup discharge, and allowing the wall charge necessary for an address discharge to uniformly remain within the cells of the whole screen.

In the address period, a negative scan pulse (scan) is sequentially applied to the scan electrodes (Y) and at the same time, a positive data pulse (data) is applied to the address electrodes (X). A voltage difference between the scan pulse (scan) and the data pulse (data) is added to the wall charge generated in the reset period, while the address discharge is generated within the cell to which the data pulse (data) is applied. The wall charge is generated within the cells selected by the address discharge.

During the set down period and the address period, a positive direct current voltage of the sustain voltage (Vs) is supplied to the sustain electrode (Z).

In the sustain period, the second sustain pulse (Sus2) is supplied to first sustain pulses of all scan electrodes (Y). If so, the strong sustain discharge is generated within the cells where the address discharge is generated. The strong sustain discharge allows the wall charge necessary for a next sustain discharge to be sufficiently formed within the cells. After the second sustain pulse (Sus2) is supplied to the first sustain pulse (Sus1) supplied to the scan electrodes (Y), the first sustain pulse (Sus1) is alternately supplied to the sustain electrode (Z) and the scan electrodes (Y). At this time, the sustain discharge is stably generated by the first sustain pulse (Sus1); due to the wall charge sufficiently formed within the cells by the second sustain pulse (Sus2) supplied to the scan electrodes (Y).

In other words, in the inventive driving method of the plasma display apparatus shown in FIG. 9, the second sustain pulse (Sus2) can be supplied to the first sustain pulse supplied to the scan electrodes (Y), thereby generating the stable sustain discharge irrespective of a peripheral environment and a resolution of the PDP.

Figure 10:
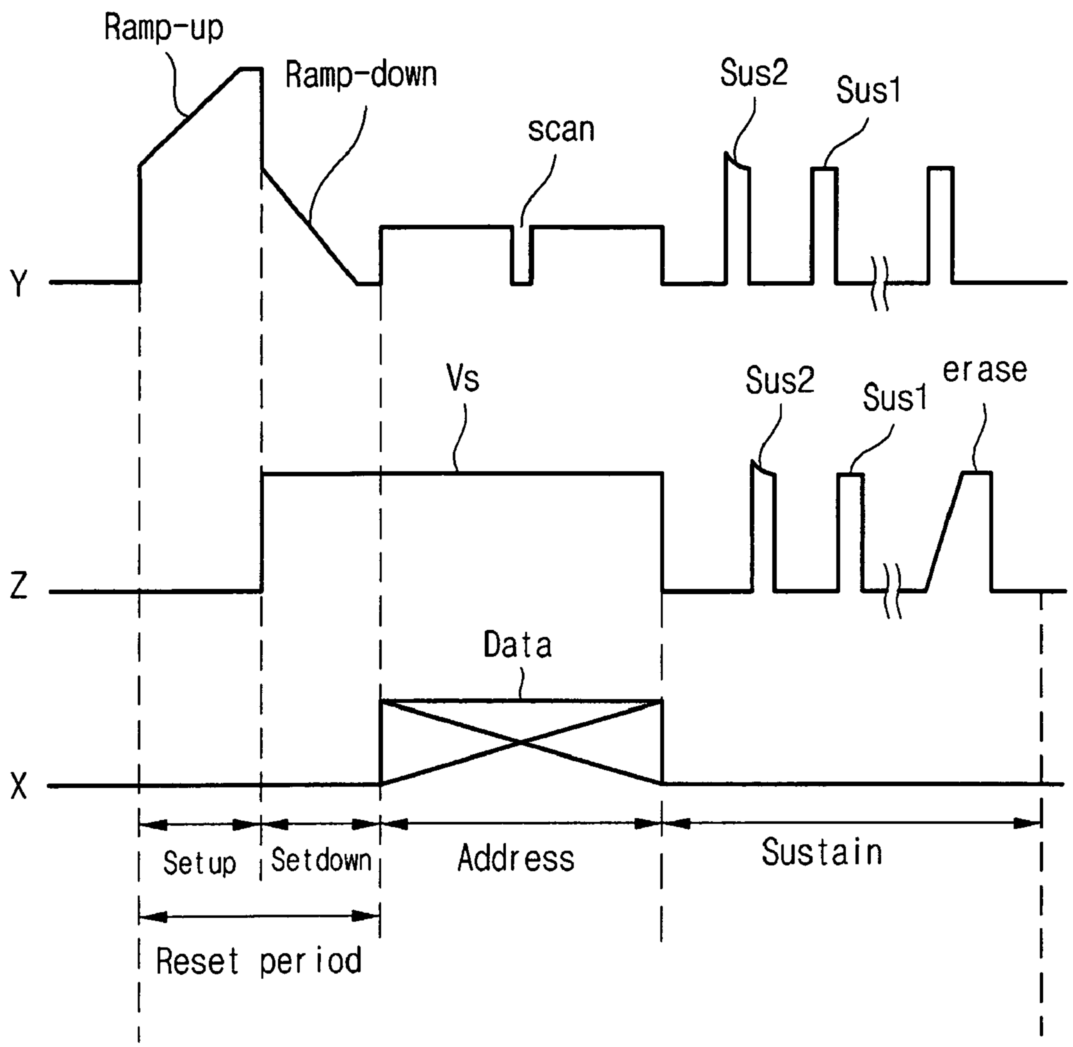
FIG. 10 is a view illustrating a driving method of a plasma display apparatus according to a second embodiment of the present invention.

Meantime, the sustain pulse supplied at an initial half of the sustain period can be set variously. For example, in the present invention, at least one second sustain pulse (Sus2) is supplied at the initial half of the sustain period, thereby stabilizing the sustain discharge. For example, as shown in FIG. 10 for describing a driving method of the plasma display apparatus according to a second embodiment of the present invention, the second sustain pulse (Sus2) can be supplied to the first sustain pulse (Sus1) supplied to the scan electrodes (Y) and the sustain electrode (Z). If so, the strong sustain discharge can be generated by the second sustain pulse, thereby stabilizing a subsequent sustain discharge.

Figure 11:
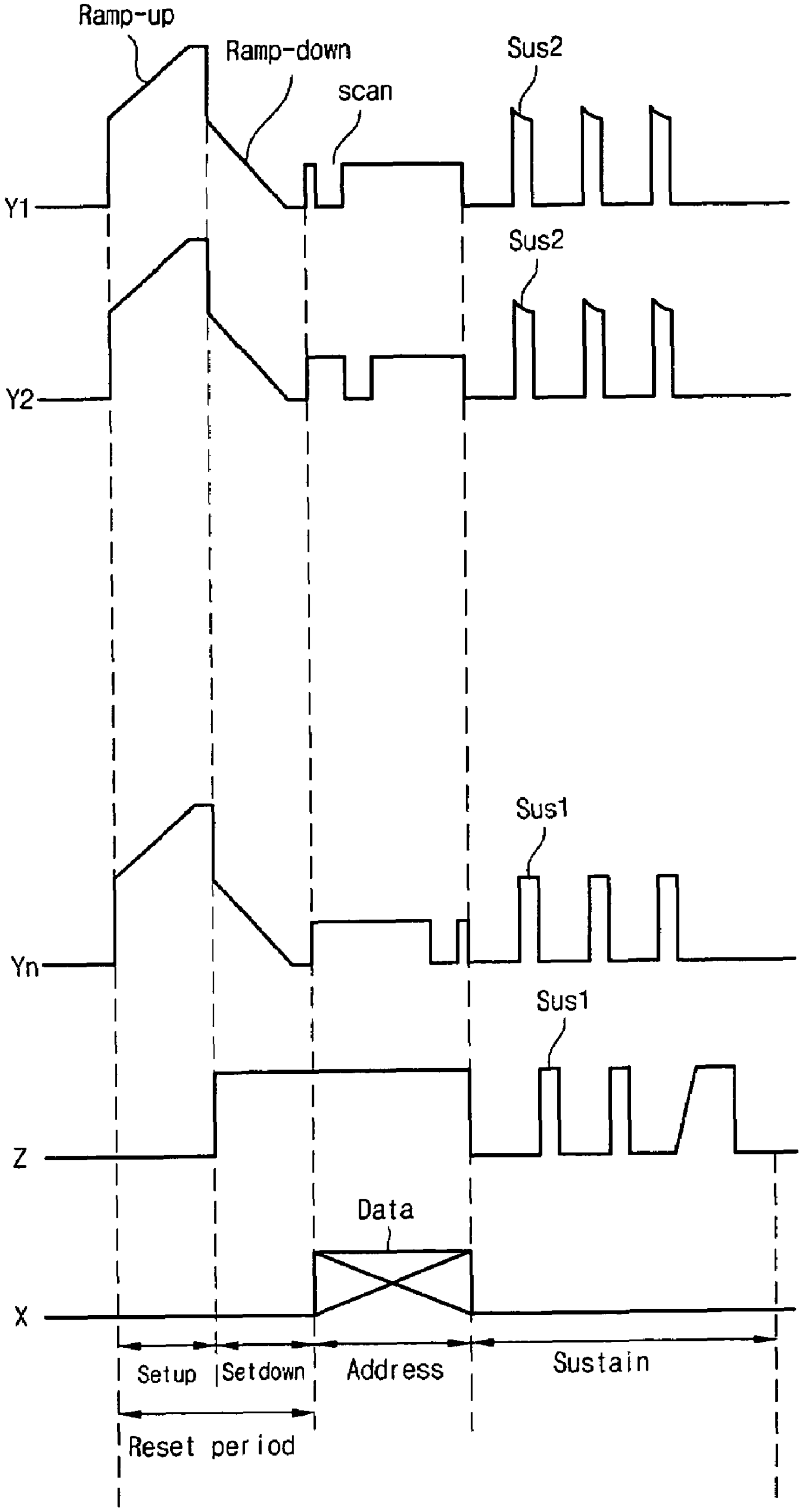
FIG. 11 is a view illustrating a third driving method of a plasma display apparatus according to a third embodiment of the present invention.

FIG. 11 is a view illustrating a driving method of the plasma display apparatus according to a third embodiment of the present invention. It is assumed that in the PDP, the unstable sustain discharge is generated within the discharge cells having an experimentally earlier scan sequence.

Referring to FIG. 11, the inventive PDP is driven by dividing each subfield into a reset period for initializing a whole screen, an address period for selecting the cell, and a sustain period for sustaining a discharge of the selected cell.

The reset period and the address period are the same as those of the driving method of FIG. 9 and therefore, their detailed description will be omitted.

During the sustain period, different sustain pulses are supplied to the scan electrodes. First, the second sustain pulse (Sus2) is supplied to a plurality of scan electrodes (Y1, Y2, . . . ) (for example, at least two scan electrodes) including a first scan electrode (Y1) having an earlier scan sequence. If so, the strong sustain discharge is generated within the cells where the address discharge is generated. In other words, in another embodiment of the present invention, the second sustain pulse (Sus2) is supplied to THE plurality of scan electrodes (Y1, Y2, . . . ) including the first scan electrode (Y1) having the earlier scan sequence, thereby generating the stable sustain discharge.

During the sustain period, the first sustain pulse (Sus1) is supplied to the scan electrodes (Y) having a later scan sequence. In other words, since the stable sustain discharge is generated in the scan electrodes (Y) having the later scan sequence, the first sustain pulse (Sus1) is supplied to minimize power consumption. If so, the stable sustain discharge is generated within the cells where the address discharge is generated.

In another embodiment of the present invention shown in FIG. 11, the second sustain pulse (Sus2) can be supplied as at least one sustain pulse supplied at an initial half of the sustain period, to the plurality of scan electrodes (Y1, Y2, . . . ) including the first scan electrode (Y1) having an earlier scan sequence. In other words, after at least one second sustain pulse (Sus2) is supplied to the plurality of scan electrodes (Y1, Y2, . . . ) including the first scan electrode (Y1), the first sustain pulse (Sus1) can be supplied to a subsequently supplied sustain pulse.

Figure 12:
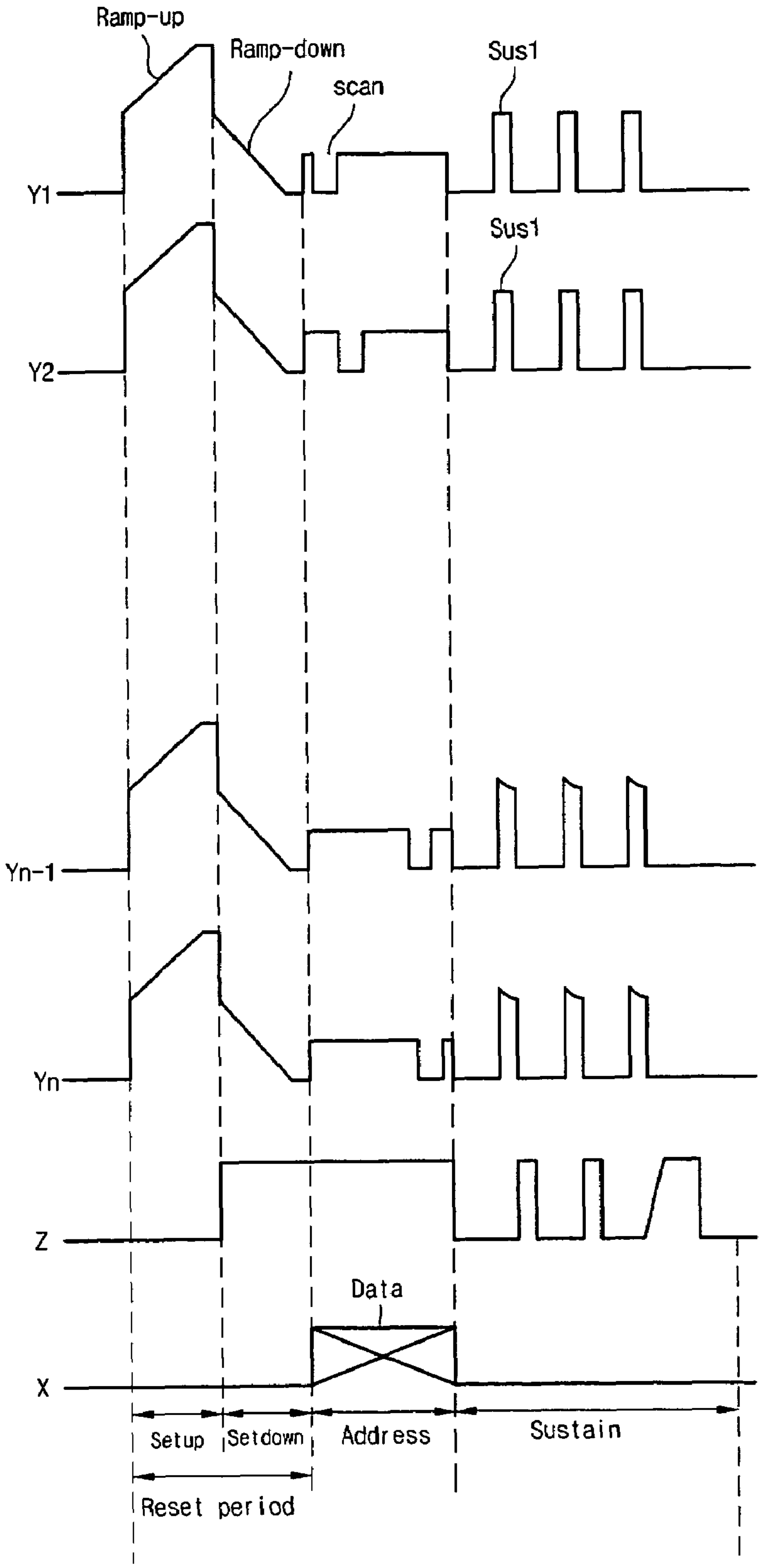
FIG. 12 is a view illustrating a driving method of a plasma display apparatus according to a fourth embodiment of the present invention.

FIG. 12 is a view illustrating a modified example of a first sustain pulse and a second sustain pulse, for describing a driving method of the plasma display apparatus according to a fourth embodiment of the present invention. It is assumed that in the PDP, the unstable sustain discharge is generated within the discharge cells having the experimentally later scan sequence.

Referring to FIG. 12, the inventive PDP is driven by dividing each subfield into a reset period for initializing a whole screen, an address period for selecting a cell, and a sustain period for sustaining a discharge of the selected cell.

The reset period and the address period are the same as those of the driving method of FIG. 9 and therefore, their detailed descriptions will be omitted.

During the sustain period, different sustain pulses are supplied to the scan electrodes. First, the second sustain pulse (Sus2) is supplied to a plurality of scan electrodes (Yn, Yn-1, . . . ) (for example, at least two scan electrodes) including the last scan electrode (Yn) having the later scan sequence. If so, the strong sustain discharge is generated within the cells where the address discharge is generated. In other words, in another embodiment of the present invention, the second sustain pulse (Sus2) is supplied to the plurality of scan electrodes (Yn, Yn-1, . . . ) including the last scan electrode (Yn) having the later scan sequence, thereby generating the stable sustain discharge.

During the sustain period, the first sustain pulse (Sus1) is supplied to the scan electrodes (Y) having the earlier scan sequence. In other words, since the stable sustain discharge is generated in the scan electrodes (Y) having the earlier scan sequence, the first sustain pulse (Sus1) is supplied to minimize power consumption. If so, the stable sustain discharge is generated within the discharge cells where the address discharge is generated.

In another embodiment of the present invention of FIG. 12, the second sustain pulse (Sus2) can be supplied as at least one sustain pulse supplied to an initial half of the sustain period, to the plurality of scan electrodes (Yn, Yn-1, . . . ) including the last scan electrode (Yn) having the later scan sequence. In other words, after at least one second sustain pulse (Sus2) is supplied to the plurality of scan electrodes (Yn, Yn-1, . . . ) including the last scan electrode (Yn), the first sustain pulse (Sus1) can be supplied to the subsequently supplied sustain pulse.

Figure 1:
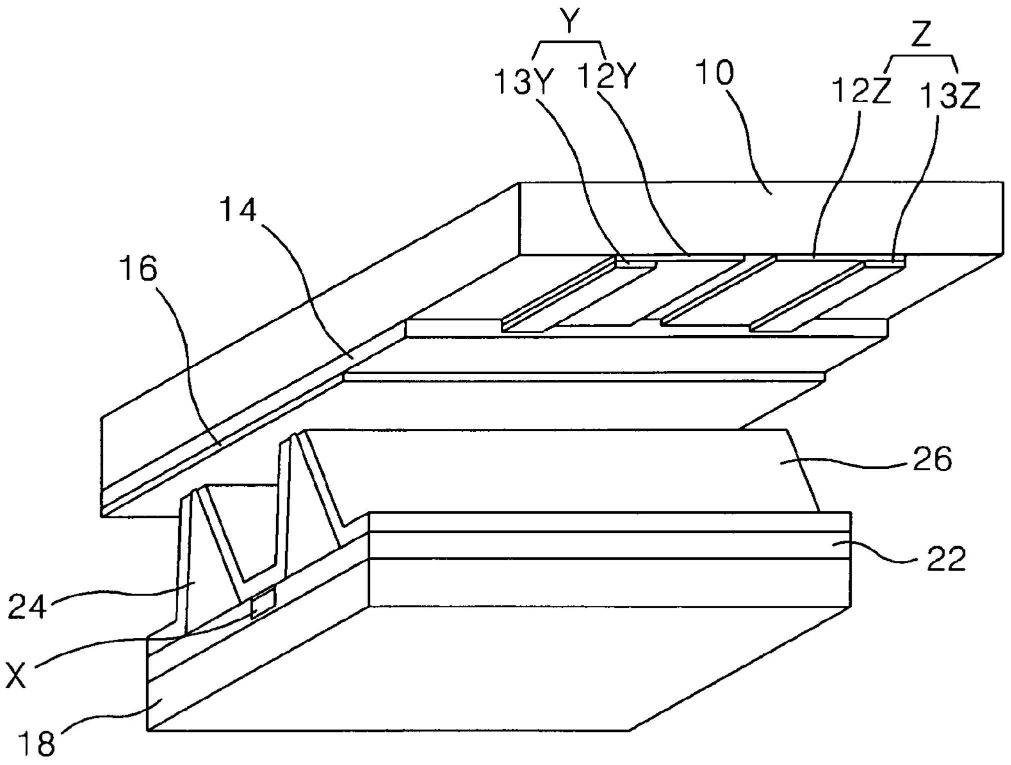
Fig. 1 Related Art
FIG. 1 is a perspective view illustrating a discharge cell structure of a conventional three-electrode alternating current surface discharge type plasma display panel.
Figure 2:
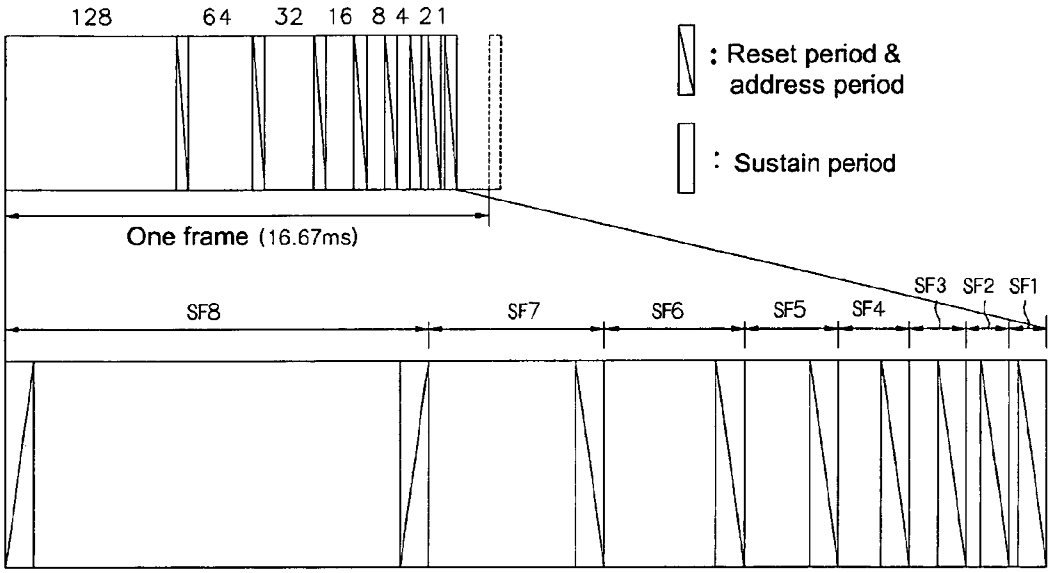
Fig. 2 Related Art
FIG. 2 is a view illustrating an example of one frame of a conventional plasma display panel.
Figure 3:
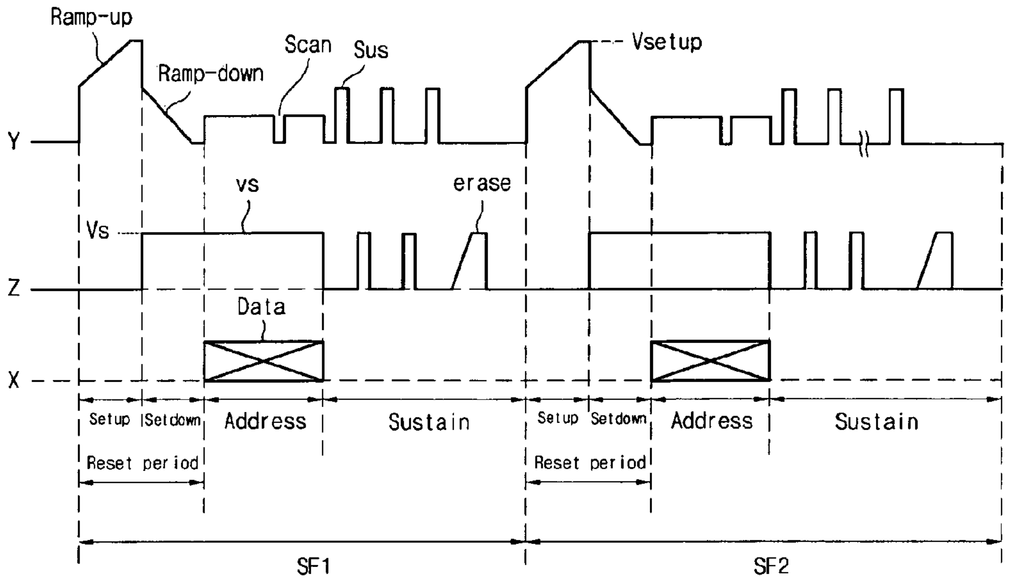
Fig. 3 Related Art
FIG. 3 is a waveform diagram illustrating a driving method of a conventional plasma display panel.

The inventive driving waveforms shown in FIGS. 9 to 12 can be selectively applied correspondingly to a driving temperature of the PDP. In other words, when the PDP is driven at a temperature between a high temperature and a low temperature, a conventional driving waveform of FIG. 3 is applied to the electrodes. When the PDP is driven at the low temperature or the high temperature, the inventive driving waveforms shown in FIGS. 9 to 12 are applied. If the PDP is driven at the low temperature or the high temperature, and the inventive driving waveform is applied, the stable sustain discharge is generated. Accordingly, an image can be displayed at a desired grayscale. The present invention can additionally include at least one temperature sensor at the external of a panel to measure the driving temperature of the PDP.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A plasma display apparatus for displaying an image by dividing one subfield into a reset period, an address period, and a sustain period, wherein when a switch connected to a sustain voltage source is turned on in the sustain period to supply a sustain pulse to a plasma display panel capacitor, a rising slope of the sustain pulse is controlled according to a temperature of a plasma display panel.

2. The apparatus of claim 1, wherein the sustain pulse having the controlled rising slope comprises:

a first sustain pulse having a rising slope, and supplied to at least one scan electrode when the plasma display panel is driven at any one of a high temperature and a low temperature; and a second sustain pulse having a rising slope more smooth than that of the first sustain pulse, and supplied to at least one scan electrode when the plasma display panel is driven at a temperature between the high temperature and the low temperature.

3. The apparatus of claim 2, wherein when the plasma display panel is driven at any one of the high temperature and the low temperature, the first sustain pulse is supplied to all scan electrodes at an initial half of the sustain period.

4. The apparatus of claim 2, wherein when the plasma display panel is driven at any one of the high temperature and the low temperature, the first sustain pulse is supplied to at least one scan electrode having an earlier scan sequence.

5. The apparatus of claim 2, wherein when the plasma display panel is driven at any one of the high temperature and the low temperature, the first sustain pulse is supplied to at least one scan electrode having a later scan sequence.

6. The apparatus of claim 2, wherein the first sustain pulse supplies a voltage, which rises in a resonant wave format due to resonance of external capacitor and inductor, to a plasma display panel capacitor equivalently provided between the scan electrode and a sustain electrode, and wherein the first sustain pulse turns on the switch connected to the sustain voltage source to supply a voltage of a sustain voltage source to the plasma display panel capacitor when half or less of the sustain voltage is supplied to the plasma display panel capacitor.

7. The apparatus of claim 2, wherein the second sustain pulse supplies a voltage, which rises in a resonant wave format due to resonance of external capacitor and inductor, to a plasma display panel capacitor equivalently provided between the scan electrode and a sustain electrode, and wherein the first sustain pulse turns on the switch connected to the sustain voltage source when the sustain voltage is approximately supplied to the plasma display panel capacitor.

* * * * *